(12) United States Patent
Vaughn et al.

(10) Patent No.: US 11,074,090 B2
(45) Date of Patent: Jul. 27, 2021

(54) VIRTUAL ACTION-BASED TROUBLESHOOTER

(71) Applicant: International Business Machines Corporation, Armonk, NY (US)

(72) Inventors: Garfield Vaughn, South Windsor, CT (US); Gandhi Sivakumar, Bentleigh (AU); Vasanthi M. Gopal, Plainsboro, NJ (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 15/974,786

(22) Filed: May 9, 2018

(65) Prior Publication Data

US 2019/0347117 A1 Nov. 14, 2019

(51) Int. Cl.
 *G06F 9/451* (2018.01)
 *H04L 12/58* (2006.01)
 *G06F 16/951* (2019.01)
 *G06F 16/58* (2019.01)

(52) U.S. Cl.
 CPC .......... *G06F 9/453* (2018.02); *G06F 16/5866* (2019.01); *G06F 16/951* (2019.01); *H04L 51/02* (2013.01)

(58) Field of Classification Search
 CPC .... G06F 9/453; G06F 16/951; G06F 16/5866; H04L 51/02
 USPC ........................................ 707/736, 769, 748
 See application file for complete search history.

(56) References Cited

U.S. PATENT DOCUMENTS

| 6,115,489 | A | * | 9/2000 | Gupta | G16H 30/20 |
|---|---|---|---|---|---|
| | | | | | 382/141 |
| 8,275,545 | B2 | * | 9/2012 | Roulland | H04M 1/6066 |
| | | | | | 701/525 |
| 9,104,939 | B2 | * | 8/2015 | Seyfried | G06K 9/3258 |
| 9,111,147 | B2 | * | 8/2015 | Thornton | G06K 9/00805 |
| 10,133,653 | B2 | * | 11/2018 | O'Riordan | G06F 11/3636 |
| 2002/0120674 | A1 | | 8/2002 | Son et al. | |
| 2010/0279659 | A1 | | 11/2010 | Harish | |
| 2011/0175901 | A1 | | 7/2011 | Meunier et al. | |
| 2013/0155229 | A1 | * | 6/2013 | Thornton | H04N 7/18 |
| | | | | | 348/143 |
| 2013/0227350 | A1 | * | 8/2013 | O'Riordan | G06F 11/3636 |
| | | | | | 714/45 |
| 2013/0314749 | A1 | * | 11/2013 | Boyd | G09B 5/02 |
| | | | | | 358/1.18 |

(Continued)

*Primary Examiner* — Phong H Nguyen
(74) *Attorney, Agent, or Firm* — Schmeiser, Olsen & Watts, LLP; Brian Restauro

(57) ABSTRACT

A system and method for aiding a user in troubleshooting a problem includes extracting one or more entities and actions from a problem statement received from a user computing device, wherein, in response to the extracting: mapping, the one or more entities and actions to one or more images related to the one or more entities and actions, and ordering, the one or more entities and actions into a user action sequence, creating a pictorial sequence of user-taken actions to correct the problem, comparing the pictorial sequence of user-taken actions to correct the problem with a correct pictorial sequence to correct the problem, to identify a correct action that the user failed to perform, and isolating a portion of the correct pictorial sequence that corresponds to the correct action that the user failed to perform, for displaying to the user on the user computing system.

17 Claims, 11 Drawing Sheets

(56) References Cited

U.S. PATENT DOCUMENTS

2014/0169633 A1* 6/2014 Seyfried ............ G06K 9/00791
382/105

* cited by examiner

VIRTUAL ACTION-BASED TROUBLESHOOTER

TECHNICAL FIELD

The present invention relates to systems and methods for virtual assistant troubleshooting, and more specifically the embodiments of a virtual action-based troubleshooting system for aiding a user in troubleshooting a problem.

BACKGROUND

Artificial intelligent systems are evolving in the industry to solve a variety of problems, including virtual assistants that simulate humans at the other end of a chat or conversation with a user. Virtual assistants deployed in the field for assisting users in an installation or troubleshooting scenario are able to provide assistance to the user by providing links to media and other information.

SUMMARY

An embodiment of the present invention relates to a method, and associated computer system and computer program product, for aiding a user in troubleshooting a problem. A processor of a computing system extracts one or more entities and actions from a problem statement received from a user computing device, input by the user. In response to the extracting, the one or more entities and actions are mapped to one or more images related to the one or more entities and actions, and the one or more entities and actions are ordered into a user action sequence. A pictorial sequence of user-taken actions to correct the problem is created, wherein the pictorial sequence is displayed to the user on the user computing system, and includes the one or more images arranged in an order consistent with the user action sequence. The pictorial sequence of user-taken actions to correct the problem is compared with a correct pictorial sequence to correct the problem, to identify a correct action that the user failed to perform. A portion of the correct pictorial sequence that corresponds to the correct action that the user failed to perform is isolated, for displaying to the user on the user computing system

DETAILED DESCRIPTION

Current virtual assistants do not possess intelligence to judge that verbose does not work in some situations to troubleshoot a given problem, and lack intelligence to fully comprehend a text based chat, identify a sequence of actions, simulate the sequence of actions, identify gaps between what the user has done and the correct sequence of actions, and correct and train the users to successfully troubleshoot the given problem. For instance, the current virtual assistant chat solutions (e.g. intelligent bots) require a human to configure predefined responses based on entities. The scope of a conversation in a chat bot is limited to what the developers have configured and trained the system to understand. These current solutions fail to dynamically understand a context of a chat and provide responses that answer the user's unique inquiry.

Thus, there is a need for a virtual action-based troubleshooting system for aiding a user in troubleshooting a problem. Embodiments of the present invention may include an intelligent system that assists a human user when interacting with a virtual assistant. As the user is conversing with a chat bot, the system may identify a context of what the user is discussing. As the user describes the issue, the system can identify the items and action being discussed, and then share with the user images that represent objects and actions being discussed. As the discussion continues, the system may stitch actions together to create a sequence of actions described by the user. To help with understanding, the system may periodically look to gain confirmation from the user by providing images that may not represent the object being discussed but rather the specific action discussed by the user. The system may also compare and highlight errors between the user's defined sequence and the correct sequence that is known by the system. If the system determines that the user is still having issues, then the system may assemble and provide a visual demonstration of the correct sequence of actions.

Figure 1:
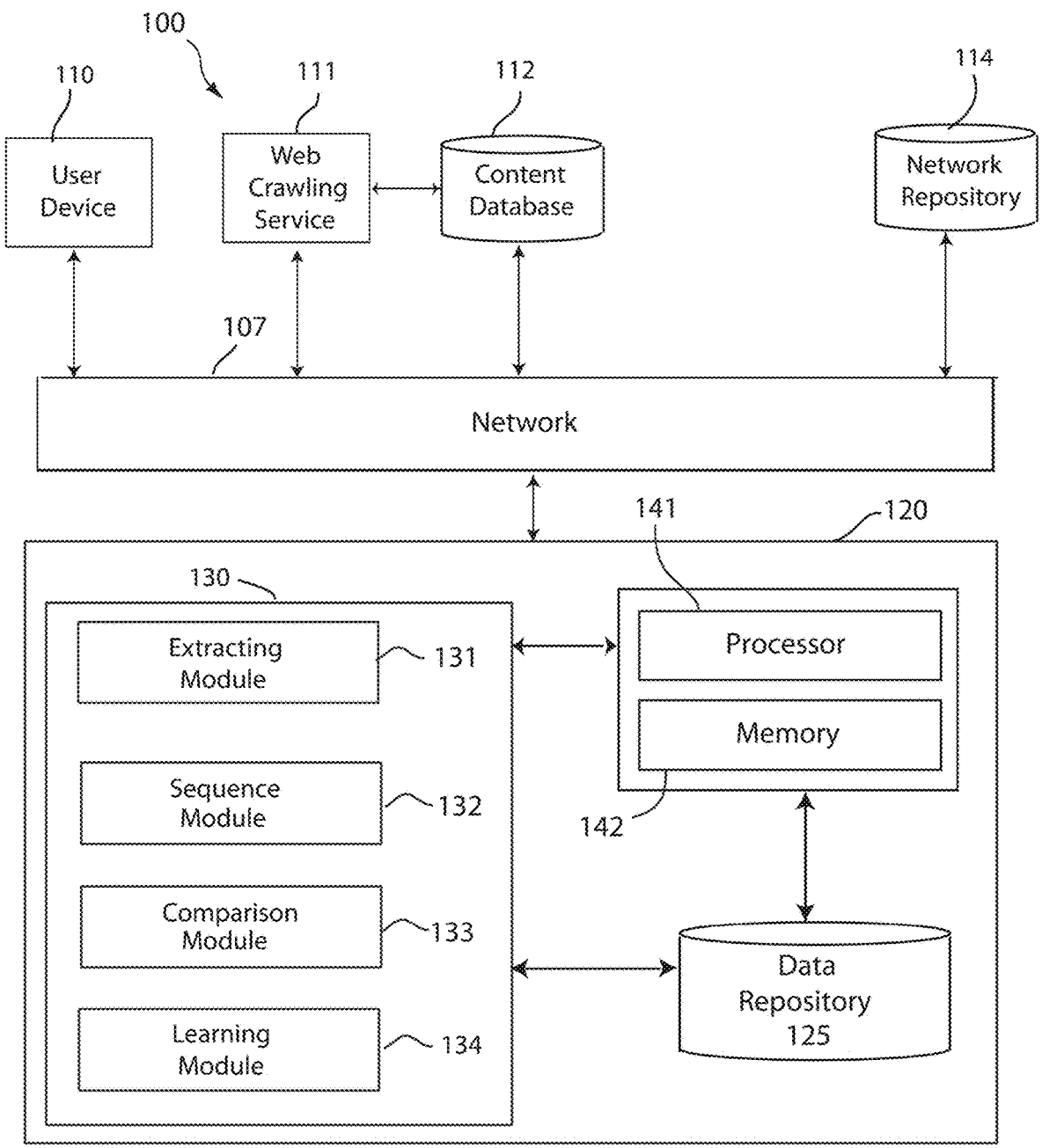
FIG. 1 depicts a block diagram of a virtual action-based troubleshooting system, in accordance with embodiments of the present invention.

Referring to the drawings, FIG. 1 depicts a block diagram of a virtual action-based troubleshooting system 100, in accordance with embodiments of the present invention. Embodiments of the virtual action-based troubleshooting system (VATS) 100 may be a system for aiding a user in troubleshooting a problem, wherein the VATS 100 may create sequences of actions taken by the user and compare the sequence of actions taken by the user to a correct sequence of actions to identify potential errors that the user took or steps that the user failed to perform which may be causing the problem to remain. Embodiments of the VATS 100 may be useful for assisting users/customers with a computing system that can intelligently help a user/customer troubleshoot a problem, without the need for the user/customer to interact with a human resource. For example, the VATS 100 may save valuable human resources as well as provide a real-time, on-demand computer-based solution for users, which can accurately assist users in troubleshooting a problem with reduced frustration. Further, the effectiveness of the using VATS 100 for troubleshooting a problem is increased because the system may learn over time to improve the quality of the service to the user. Examples of troubleshooting using VATS 100 may be a software installation, a home improvement project, adjusting settings of a computing device to accomplish a user goal, instructions to fix or repair an object, detailed step-by-step guides to building or assembling an object, maintenance of an object, and the like.

Embodiments of the VATS 100 may be a virtual assistant system, an intelligent chat solution system, an intelligent virtual assistant system, a chat bot system, a visual troubleshooting system, a visual action-based troubleshooter system, and the like. Embodiments of the VATS 100 may include a computing system 120. Embodiments of the computing system 120 may be a computer system, a computer, a server, one or more servers, a backend computing system, and the like.

Furthermore, embodiments of VATS 100 may include a user device 110, a web crawling service 111, and a content database 112 that are communicatively coupled to the computing system 120 over a computer network 107. For instance, information/data may be transmitted to and/or received from the user device 110, the web crawling service 111, and the content database 112 over a network 107. A computer network 107 may be the cloud. Further embodiments of computer network 107 may refer to a group of two or more computer systems linked together. Computer network 107 may be any type of computer network known by individuals skilled in the art. Examples of computer network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the computer network 107 may be organized as a client/server architecture.

In some embodiments, the computer network 107 may further comprise, in addition to the computing system 120, a connection to one or more network-accessible knowledge bases 114, which are network repositories containing information of the user, product information, technical information, social media platform account information, location information, user activity, user preferences, installation information, troubleshooting information, product manuals, network repositories or other systems connected to the computer network 107 that may be considered nodes of the computer network 107. In some embodiments, where the computing system 120 or network repositories allocate resources to be used by the other nodes of the computer network 107, the computing system 120 and network-accessible knowledge bases 114 may be referred to as servers.

The network-accessible knowledge bases 114 may be a data collection area on the computer network 107 which may back up and save all the data transmitted back and forth between the nodes of the computer network 107. For example, the network repository may be a data center saving and cataloging user activity data, user data, location data, user preference data, installation sequences, technical information, images, and the like, to generate both historical and predictive reports regarding a particular user or a particular sequence for troubleshooting a given problem, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the user device 110 may be a computing device, a computer, a desktop computer, a cell phone, a mobile computing device, a tablet computer, a virtual assistant device, a smart speaker, a wearable computing device, a smartwatch, and the like. The user device 110 may include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a smartphone, smartwatch, cell phone, tablet computer, and the like.

Referring still to FIG. 1, embodiments of the VATS 100 may include a web crawling service 111. Embodiments of the web crawling service 111 may be communicatively coupled to the computing system 120 over computer network 107. Embodiments of the web crawling service 111 of the VATS 100 depicted in FIG. 1 may be one or more web crawling services, engines, platforms, system, web crawler, web search engine, Internet bot, spider, etc. Moreover, embodiments of web crawling service 111 may be one or more websites, applications, databases, storage devices, repositories, servers, computers, engines, and the like, that may service, run, search, analyze, store or otherwise obtain one or more images, information, videos, diagrams, content, etc., by crawling the Internet. The web crawler 111 may be accessed or may share a communication link over network 107, and may be managed and/or controlled by a third party.

Furthermore, embodiments of the computing system 120 may be equipped with a memory device 142 which may store various data/information/code, and a processor 141 for implementing the tasks associated with the VATS 100. In some embodiments, a virtual assistant application 130 may be loaded in the memory device 142 of the computing system 120. Embodiments of the virtual assistant application 130 may be an interface, an application, a program, a module, or a combination of modules. In an exemplary embodiment, the virtual assistant application 130 may be a software application running on one or more back end servers, servicing a user device 110, wherein a user interface portion of the software application may also run on the user device 110.

The virtual assistant application 130 of the computing system 120 may include a extracting module 131, a sequence module 132, a comparison module 133, and a learning module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Figure 2:
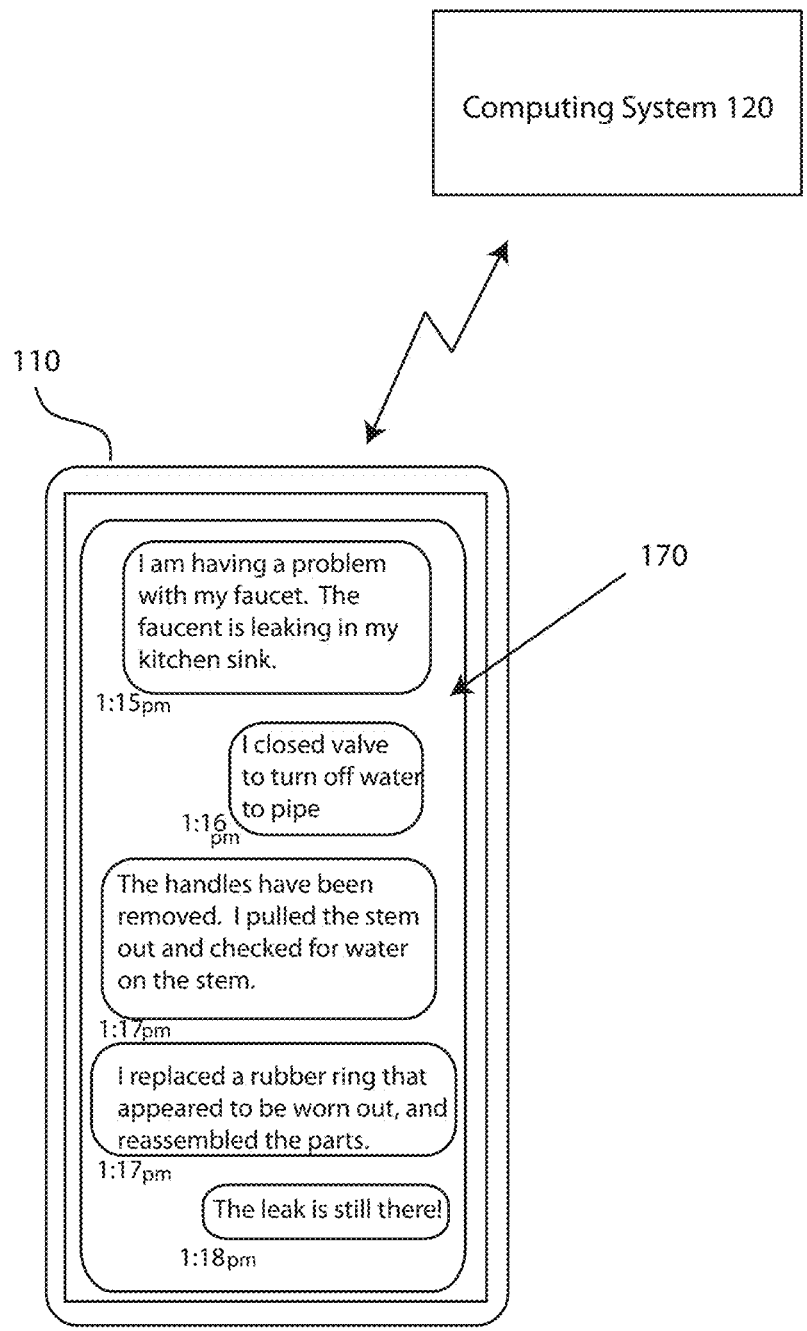
FIG. 2 depicts a schematic view of a user device, wherein the user has input a problem statement, in accordance with embodiments of the present invention.

Embodiments of the extracting module 131 may include one or more components of hardware and/or software program code for extracting one or more entities and actions from a problem statement received from a user computing device, input by the user. FIG. 2 depicts a schematic view of a user device 110, wherein the user has input a problem statement 170, in accordance with embodiments of the present invention. The problem statement 170 may be a statement of the problem, a list or explanation of what the user has performed already to correct a problem, a user summary of events, a request for help to fix, troubleshoot, assemble, build, achieve a goal, adjust a setting, a statement of actions that the user has already taken in an attempt to correct the problem, and the like. The problem statement 170 may be input by the user via text, voice-to-text (e.g. virtual assistant associated with mobile phone), dictation functionality, and the like. The problem statement 170 may be received by the computing system 120 over network 107 in a single message or a series of messages transmitted to the computing system 120 at different times. In the exemplary embodiment shown in FIG. 2, the problem statement 170 is transmitted to the computing system 120 over a series of messages at different times. The first message/communication to the computing system 120 is sent at 1:15 pm, stating, "I am having a problem with my faucet. The faucet is leaking in my kitchen sink." The second message/communication to the computing system 120 is sent at 1:16 pm, stating, "I closed valve to turn off water to pipe." The third message/communication of the problem statement 170 is sent at 1:17 pm, stating, "The handles have been removed. I pulled the stem out and checked for water on the stem." The fourth message/communication transmitted to the computing system 120 is sent at 1:17 pm as well, stating, "I replaced a rubber ring that appeared to be worn out, and reassembled the parts." The fifth and final message/communication received by the computing system 120 is sent at 1:18 pm, stating, "The leak is still there."

Figure 3:
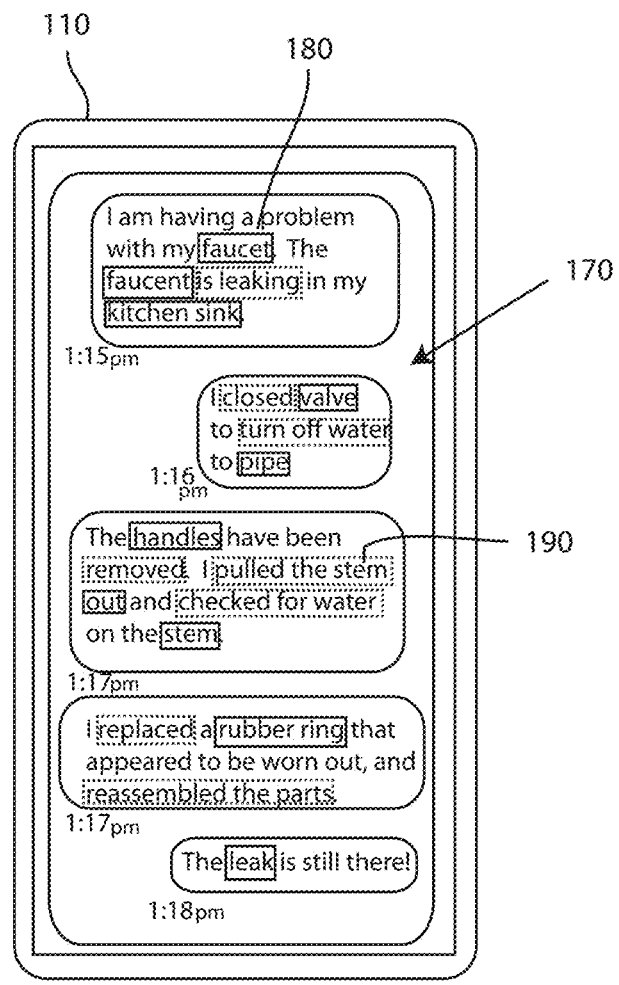
FIG. 3 depicts a schematic view of the entities and actions being extracted from the problem statement of FIG. 2, in accordance with embodiments of the present invention.
Figure 4:
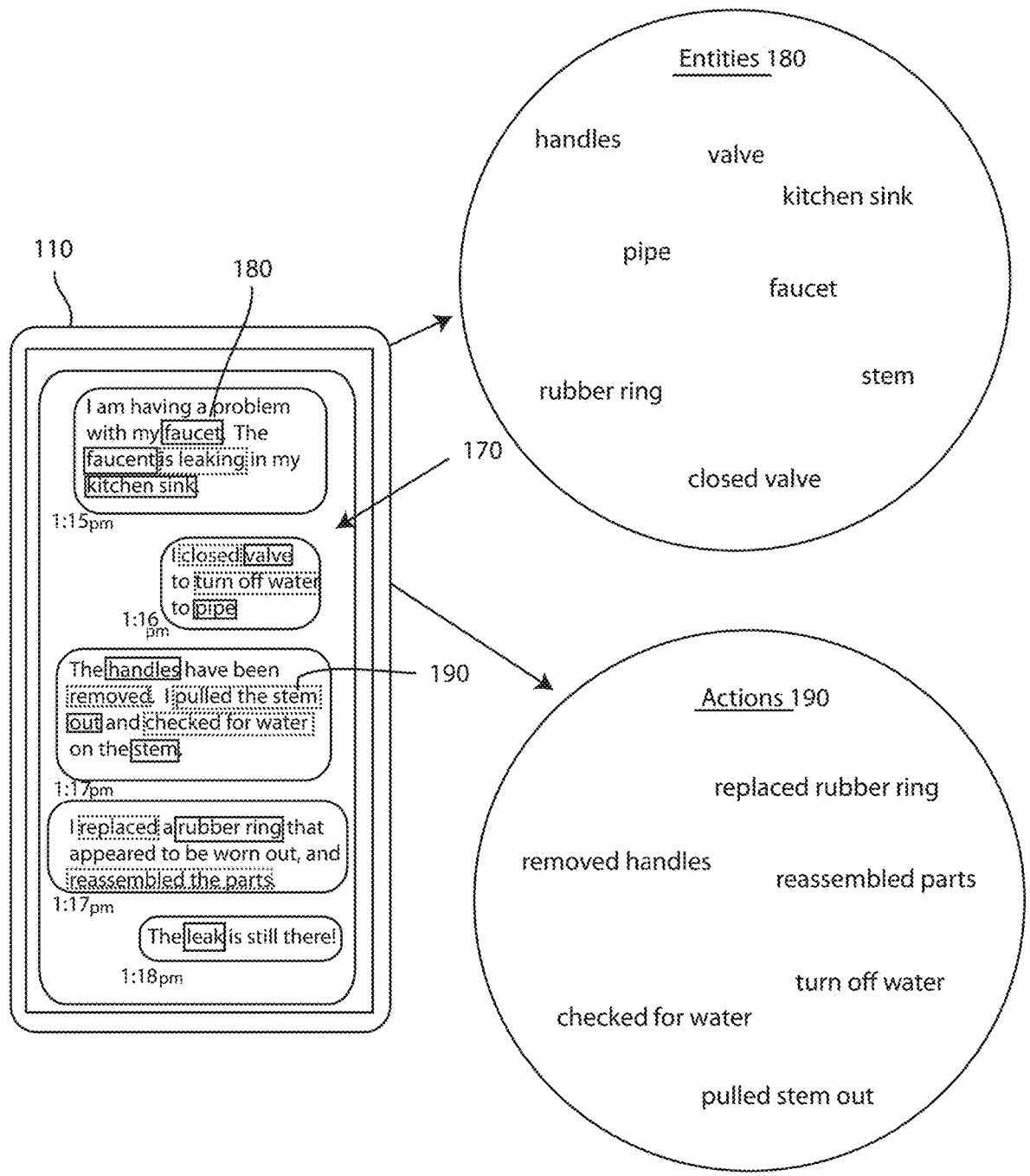
FIG. 4 depicts a schematic view of extracted entities and extracted actions from the problem statement of FIG. 2, in accordance with embodiments of the present invention.

Moreover, the problem statement 170 may be transmitted to the computing system 120 in real-time, such that the extracting module 131 may parse, analyze, extract, or otherwise process the text of the problem statement as the problem statement is being input by the user. For instance, embodiments of the extracting module 131 may, in response to receiving the message(s) from the user device 110, analyze the message(s)/text to extract the entities and actions from the problem statement 170. The received problem statement 170 may be analyzed by a text analysis system that may parse, identify, scan, detect, analyze etc. words using, for example, a natural language processing technique, natural language classification, pre-trained language model, etc. to extract entities and actions of the problem statement 170. Entities may be a person, place, thing, noun, adjective referring to object, an object, and the like, and actions may be a verb, user action, step, task, and the like, which may be contained in a problem statement 170 input by a user. Embodiments of the extracting module 131 may thus process the problem statement 170. The extracting may be performed in real-time as each message is received, or as each word is input by the user at the user device 110. FIG. 3 depicts a schematic view of the entities 180 and actions 190 being extracted from the problem statement 170 of FIG. 2, in accordance with embodiments of the present invention. Here, the extracting module 131 of the computing system 120 may extract entities 180 from the problem statement 170, in real-time or otherwise, such as "faucet," "kitchen sink," "valve," "water," "pipe," "handles," "stem,", "rubber ring," "worn out rubber ring," "parts," and "leak." Similarly, embodiments of the extracting module 131 may extract actions 190 from the problem statement 170, in real-time or otherwise, such as "having a problem," "faucet is leaking," "I closed valve," "turn off water to pipe," "handles have been removed," "checked for water on stem," "replaced rubber ring," and "reassembled parts." The extracted entities 180 and extracted actions 190 may be separated and temporarily or permanently stored by the computer system 120 for further analysis by the virtual assistant application 130, as part of the extracting. FIG. 4 depicts a schematic view of extracted entities 180 and extracted actions 190 from the problem statement 170 of FIG. 2, in accordance with embodiments of the present invention.

Figure 5:
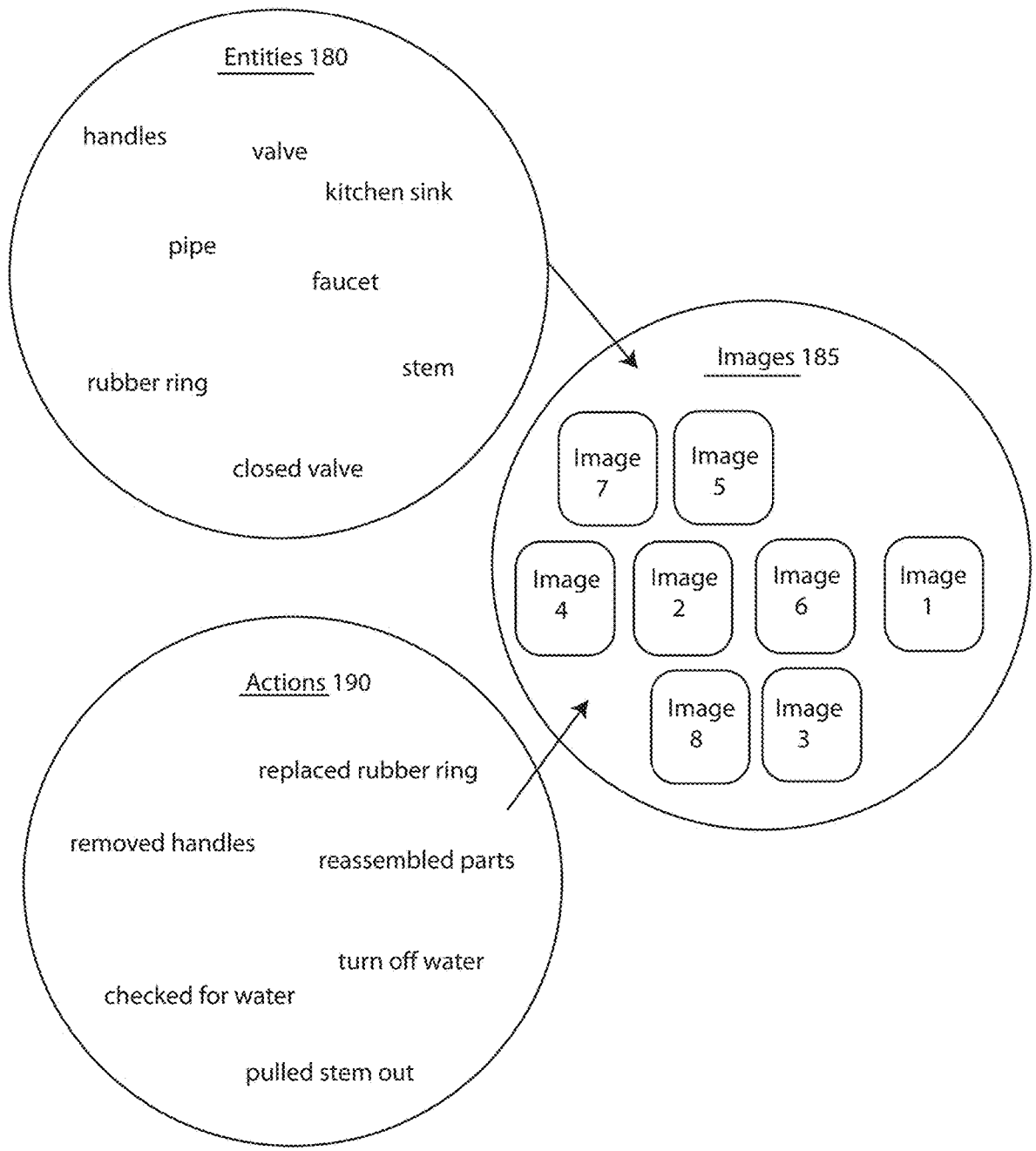
FIG. 5 depicts a schematic view of the entities and the actions extracted from the problem statement of FIG. 2 being mapped to several images that represent the entities and the actions, in accordance with embodiments of the present invention.

In response to the extracting of the entities 180 and the actions 190, embodiments of the extracting module 131 may map the one or more entities 180 and actions 190 to one or more images related to the one or more entities 180 and actions 190. FIG. 5 depicts a schematic view of the entities 180 and the actions 170 extracted from the problem statement 170 of FIG. 2 being mapped to several images 185 that represent the entities 180 and the actions 190, in accordance with embodiments of the present invention. Embodiments of the extracting module 131 may map, correlate, associate, relate, etc. one or more or all of the entities 180 and one or more or all of the actions 190 to images 185 by implementing a web crawling service 111 to crawl the Internet for images related to the one or more entities 180 and actions 190. For instance, the extracting module 131 of the computing system 120 may instruct, direct, cause, etc. the web crawling service to search the Internet for images relating, matching, corresponding, and/or relevant to the entities 180 and actions 190, based on the keywords extracted from the problem statement 170. The web crawling service 111 may locate images on the Internet or other sources using a keyword search and other language processing techniques, and then utilize an image or visual recognition engine to inspect, parse, scan, analyze, etc. a photograph, image, video, diagram, sketch, GIF, JPEG, and the like, to determine and potentially confirm that one or more descriptions or insights from the keywords that describe or are associated with the photograph, image, video, and the like either match, correspond to, relate to, are associated with, depict, etc. the entities 180 and actions 190 extracted from the problem statement 170. Further, the extracting module 131 may utilize a combination of natural language techniques, cognitive applications/engines, and visual recognition engines to determine a context, content, and relevancy of the images 185 located by the web crawling service 111.

In addition to obtaining images 185 using the web crawling service 111, embodiments of the extracting module 131 may search a content database 112 for stored images relating to the one or more entities 180 and actions 190 to map, correlate, associate, relate, etc. one or more or all of the entities 180 and one or more or all of the actions 190 to images 185. For instance, the extracting module 131 may access, call, search, or otherwise retrieve relevant images 185 from the content database 112, which may have been previously categorized and stored based on previous troubleshooting exercises completed by the virtual assistant application 130. Images 185 may be stored in an "Images" table of the content database 112. Furthermore, embodiments of the extracting module 131 may tag the one or images 185 obtained as a function of the implementing the web crawling service 111 and/or searching the image content database 112 with a related entity 180 or action 190 from the one or more entities 180 and actions 190. For example, the extracting module 131 may tag "Image 1" as a "faucet," "Image 2" as a "valve," "Image 3" as "closing a valve," "Image 4" as "removing the stem", "Image 5" as a "worn our rubber ring," and so on. The images 1-8 may be images, photographs, diagrams, etc. that may illustrate either the entity 180, the action 190, or a specific action involving the entity that is consistent with the problem statement 170 input by the user.

In some embodiments, the extracting module 131 may present the images 185 to the user to confirm an accuracy of the images 185 as the images 185 relate to the user's problem statement 170. For instance, the extracting module 131 may request that the user confirm an accuracy of images 185, prior to moving forward to the sequencing aspect of the virtual assistant application 130. The extracting module 131 may cause an image 185 to be displayed on a screen of the user device 110, prompting the user to confirm that the images shown on the screen indeed is the correct entity (e.g. object) or action (e.g. a step the user has already taken) that the user is dealing with. In an exemplary embodiment, the extracting module 131 may present an image of a "kitchen sink faucet" and ask the user to confirm that the user is dealing with a problem with a "kitchen sink faucet." If the user confirms that the problem statement 170 is dealing with a "kitchen sink faucet," the extracting module 131 may derive further information, by presenting the user with images of different kinds of "kitchen sink faucets" to determine a type of "kitchen sink faucet." For example, the extracting module 131 may display an image 185 of a "compression faucet," a "ball faucet", "a cartridge faucet," and a "ceramic-disk faucet." The user may, in response, click, touch, orally respond to a prompt, or otherwise interact with the user device 110 to confirm that the image 185 of the "compression faucet" correctly depicts the type of "kitchen sink faucet" the user has and is trying to fix. Similarly, the extracting module 131 may present an image of "closing a valve" and ask the user to confirm that the user has indeed closed the valve to turn off the water. If the user confirms that the user closed the valve, the extracting module 131 may derive further information, by presenting the user with images of different positions of a "valve" to ensure that the "valve" is in a proper position for troubleshooting the problem. For example, the extracting module 131 may display an image 185 of a "valve in closed position" (e.g. valve perpendicular or 90° with respect to pipe), a "valve in an open position" (e.g. valve parallel to the pipe), and a "valve in a partially closed position" (e.g. valve at 45° with respect to pipe). The user may, in response, click, touch, orally respond to a prompt, or otherwise interact with the user device 110 to confirm that the image 185 of the "valve in closed position" correctly depicts the position of the "valve" in the user's kitchen. Accordingly, embodiments of the extracting module 131 may present images of one or more entities 180 and one or more actions 190 to the user to confirm an accuracy of the mapping of the images to the entities 180 and the actions 190 extracted from the problem statement 170.

Referring still to FIG. 1 embodiments of the computing system 120 may include a sequence module 132. Embodiments of the sequence module 132 may include one or more components of hardware and/or software program code for ordering, arranging, filtering, etc. the one or more entities 180 and actions 190 into a user action sequence. For instance, embodiments of the sequence module 132 of the virtual assistant application 130 of computing system 120 may order the entities 180 and action 190, and/or the images 185 associated therewith into a user-action sequence, in response to the extracting of the problem statement 170. Embodiments of the user-action sequence may be a sequence, an order, an arrangement, a timeline, a series of actions, and the like, that the user has undertaken to correct the problem (e.g. fix a leaking faucet). The user-action sequence generated, created, established, etc. by the sequence module 132 may be in chronological order according to a time each user-action was received via the problem statement (e.g. using time stamps). For instance, embodiments of the sequence module 132 may track a sequential order that text of the problem statement 170 is input by the user, as problem statement is received from the user device 110. In the example shown in FIG. 2, a sequential ordering of user-actions, based on the tracking by the sequence module 132 may be, from first to last: "closing the valve to turn off water," "removing handles," "pulling stem out," "checking for water on stem," "replacing rubber ring," and "reassembling the parts to the faucet."

Figure 6:
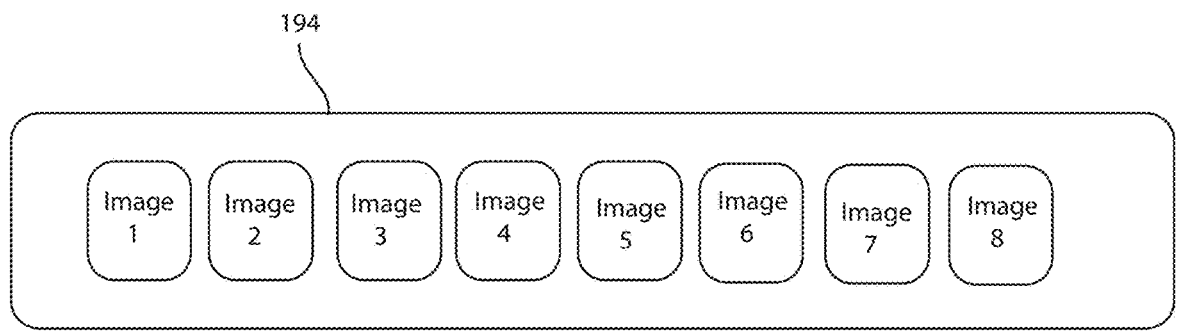
FIG. 6 depicts a schematic view of a pictorial sequence of user-taken actions, in accordance with embodiments of the present invention.

FIG. 6 depicts a schematic view of a pictorial sequence of user-taken actions 194, in accordance with embodiments of the present invention. Embodiments of the sequence module 132 may create a pictorial or visual sequence of user-taken actions to correct the problem, which includes a sequence of images 185 arranged in an order consistent with the user action sequence derived as described above. For instance, the sequence module 132 may stitch together a plurality of obtained images 185 associated with the entities 180 and actions 190 that visually represent a sequence of actions that the user has already undertaken to correct the problem, in accordance with the user-action sequence. The pictorial sequence of user-taken actions 194 may be displayed to the user on the user device 110 as a virtual demonstration of the actions that the user has taken. The pictorial sequence of user-taken actions 194 may be displayed as a series of still images, shown in sequential order, or may displayed to the user as a continuous video. Thus, the user is presented with the pictorial sequence of user-taken actions 194, which has been created automatically in response to the user inputting a problem statement 170.

Embodiments of the sequence module 132 may request that the user confirm an accuracy of the pictorial sequence of the user-taken action 194, prior to moving forward to the comparing aspect of the virtual assistant application 130. The sequence module 132 may cause the pictorial sequence of the user-taken action 194 to be displayed on a screen of the user device 110, prompting the user to confirm that the sequence of images shown on the screen are indeed the steps the user took, in the correct order. If the user indicates that the presented pictorial sequence of the user-taken action 194 is incorrect, the sequence module 132 may request that the user re-arrange the various images in a correct sequence. For example, the sequence module 132 may present individual images 185 on the screen of the user device 110, and the user may touch/click and drag the individual images into a particular order in which the user undertook the actions and with which entities. The sequence module 132 may then update the pictorial sequence of the user-taken action 194 accordingly. Accordingly, embodiments of the sequence module 132 may present the pictorial sequence of the user-taken action 194 to the user to confirm an accuracy of the pictorial sequence of the user-taken action 194, extracted from the problem statement 170.

Figure 7:
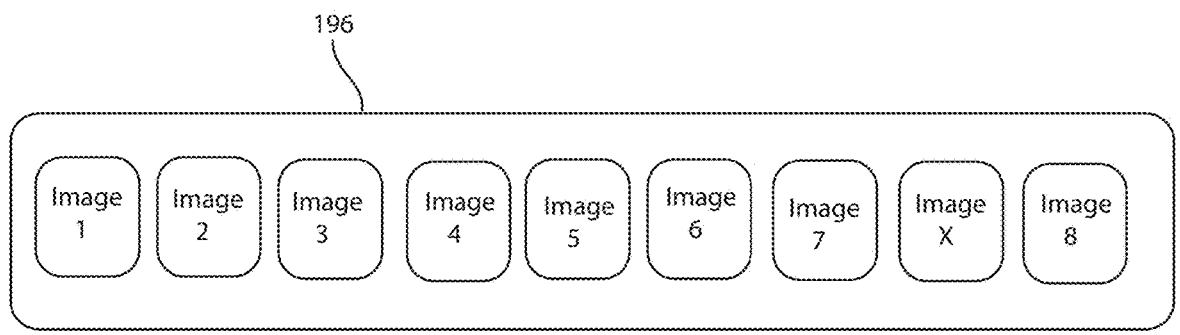
FIG. 7 depicts a schematic view of a correct pictorial sequence to correct the problem, in accordance with embodiments of the present invention.

Referring back to FIG. 1, and with additional reference to FIG. 7, embodiments of the computing system 120 may include a comparison module 133. Embodiments of the comparison module 133 may include one or more components of hardware and/or software program for comparing the pictorial sequence of user-taken actions 194 to correct the problem with a correct pictorial sequence 196 to correct the problem. FIG. 7 depicts a schematic view of a correct pictorial sequence 196 to correct the problem, in accordance with embodiments of the present invention. Embodiments of the correct pictorial sequence to correct the problem 196 may be stored on a content database 112, which can be accessed by the comparison module 133 over network 107. The content database 112 may include stored correct pictorial sequences for a vast number of troubleshooting scenarios, and may be updated over time to improve an accuracy of currently stored correct pictorial sequences associated with various problems, based on information learned from accessing the Internet to crawl for images related to entities and actions. If the correct pictorial sequence 196 to correct the problem is not found in the content database 112, the comparison module 133 may utilize the web crawling service 111 to locate various troubleshooting information, including step-by-step instructions, product manuals, troubleshooting websites, diagrams, blogs, etc. to develop a correct pictorial sequences 196.

The comparison module 133 may compare the correct pictorial sequence 196 to correct the problem with the pictorial sequence of user-taken actions 194 to identify a difference between the correct pictorial sequence 196 and the pictorial sequence of user-taken actions 194. The difference may be a correct action that the user failed to perform, or an action that the user performed incorrectly. In FIG. 7, the correct pictorial sequence 196 includes "Image X" that is not found in the pictorial sequence of user-taken actions 194. "Image X" may be an image depicting an action that the user did not perform, which, when performed by the user, should resolve the problem. In an exemplary embodiment relating to the problem of a leaking faucet described in the problem statement 170 of FIG. 2, "Image X" may be an image or a series of successive images that depict a step or steps of "identifying the seat washer, removing the seat washer, and replacing the seat washer with a new seat washer." From the pictorial sequence of user-taken actions 194, the comparison module 133 has learned that the user has "replaced the rubber ring" but has not replaced the "seat washer," which is likely the reason that the "faucet is still leaking." In other words, the pictorial sequence of user-taken actions 194 does not include an image or images depicting "identifying the seat washer, removing the seat washer, and replacing the seat washer with a new seat washer." Thus, embodiments of the comparison module 133 may determine that the user failed to perform a step of "identifying the seat washer, removing the seat washer, and replacing the seat washer with a new seat washer."

Furthermore, embodiments of the comparison module 133 may isolate a portion of the correct pictorial sequence 196 that corresponds to the correct action that the user failed to perform, for displaying to the user on the user device 110.

Figure 8:
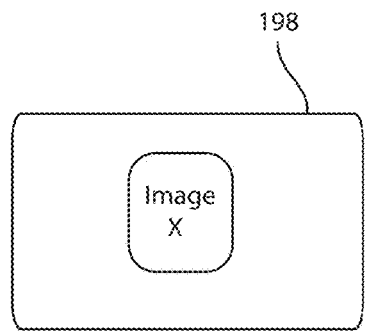
FIG. 8 depicts a schematic view of an image that has been isolated from the correct pictorial sequence of FIG. 7, in accordance with embodiments of the present invention.

FIG. 8 depicts a schematic view of an image that has been isolated from the correct pictorial sequence 196 of FIG. 7, in accordance with embodiments of the present invention. Embodiments of the comparison module 133 may isolate, separate, or otherwise identify the missing image or images (e.g. "Image X") from the pictorial sequence of user-taken actions 194, and then display the isolated image to the user on the user device 110. The user may then realize what step or action the user needs to take to correct the problem. To further assist the user in correcting the problem, the comparison module 133 may provide the entire correct pictorial sequence to correct the problem 196 to the user device 110. Sending the entire correct pictorial sequence to correct the problem 196 may be done in response to learning that the problem is still not resolved. The entire correct pictorial sequence to correct the problem 196 may be displayed to the user a visual demonstration so that the user can visually see the steps taken to efficiently and correct troubleshoot the problem.

The comparison module 133 of the computing device 120 may assess whether the user needs further virtual training, and may initiate a guided virtual training procedure. For example, the comparison module 133 may present each of the correct pictorial sequence to the user, as the user performs the steps. For example, the comparison module 133 may instruct the user perform a step, while providing a visual (e.g. image) of what the completed step will look like so the user can visualize the completed step. The comparison module 133 may wait for the confirmation from the user that the user has successfully completed step, and may to the next step in the correct sequence 196.

Referring again to FIG. 1, embodiments of the computing system 120 may also include a learning module 134. Embodiments of the learning module 134 may include one or more components of hardware and/or software program for updating the content database 112 with new correct pictorial sequences, refined correct pictorial sequences, adjusted correct pictorial sequences, new images that may be used when mapping images to extracted entities and actions, and the like. The learning module 134 may utilize user feedback and comments after each problem is resolved, and may update the content database 112 accordingly.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the VATS 100 offers a method to aid in a troubleshooting of a problem using a virtual assistant application 130. The VATS 100 may be individualized to each user/user device based on the given problem of the user. The system is further individualized because each user may draft a problem statement 170 differently. The VATS 100 may locate images that pertain to a first user's problem statement that may be different from images located with respect to a second user's problem statement, even though the underlying problem statement may be the same. Users learn differently have different starting points when understanding a given problem, and thus may benefit from a custom visual-action based pictorial sequence.

Furthermore, the VATS 100 improves and advances virtual assistant technology because current virtual assistants have technical problems, in that current virtual assistants lack intelligence to fully comprehend a text based chat, identify a sequence of actions, simulate the sequence of actions, identify gaps between what the user has done and the correct sequence of actions, and correct and train the users to successfully troubleshoot the given problem. For instance, the current virtual assistant chat solutions (e.g. intelligent bots) require a human to configure predefined responses based on entities. The scope of a conversation in a chat bot is limited to what the developers have configured and trained the system to understand. Embodiments of the VATS 100 provide a technical solution to the above-drawbacks by providing a visual, action-based response to a user problem statement, which actually tracks what the user has already done and creates a visual demonstration using a plurality of mapped images, and then provides the user with a corrective action in the form of action-based image. The technical solution(s) described herein is necessarily rooted in computer technology in order to overcome a problem specifically arising in the realm of virtual assistants. For instance, instead of relying on a limited number of predefined responses to user inputs or a limited number of entities and actions, the VATS 100 dynamically determines what actions the user has taken by mapping images to the user's actions, which can be confirmed by the user, thus expanding an understanding capability of the virtual assistant, as well as expanding a number of problems that troubleshooting virtual assistant may resolve.

Figure 9:
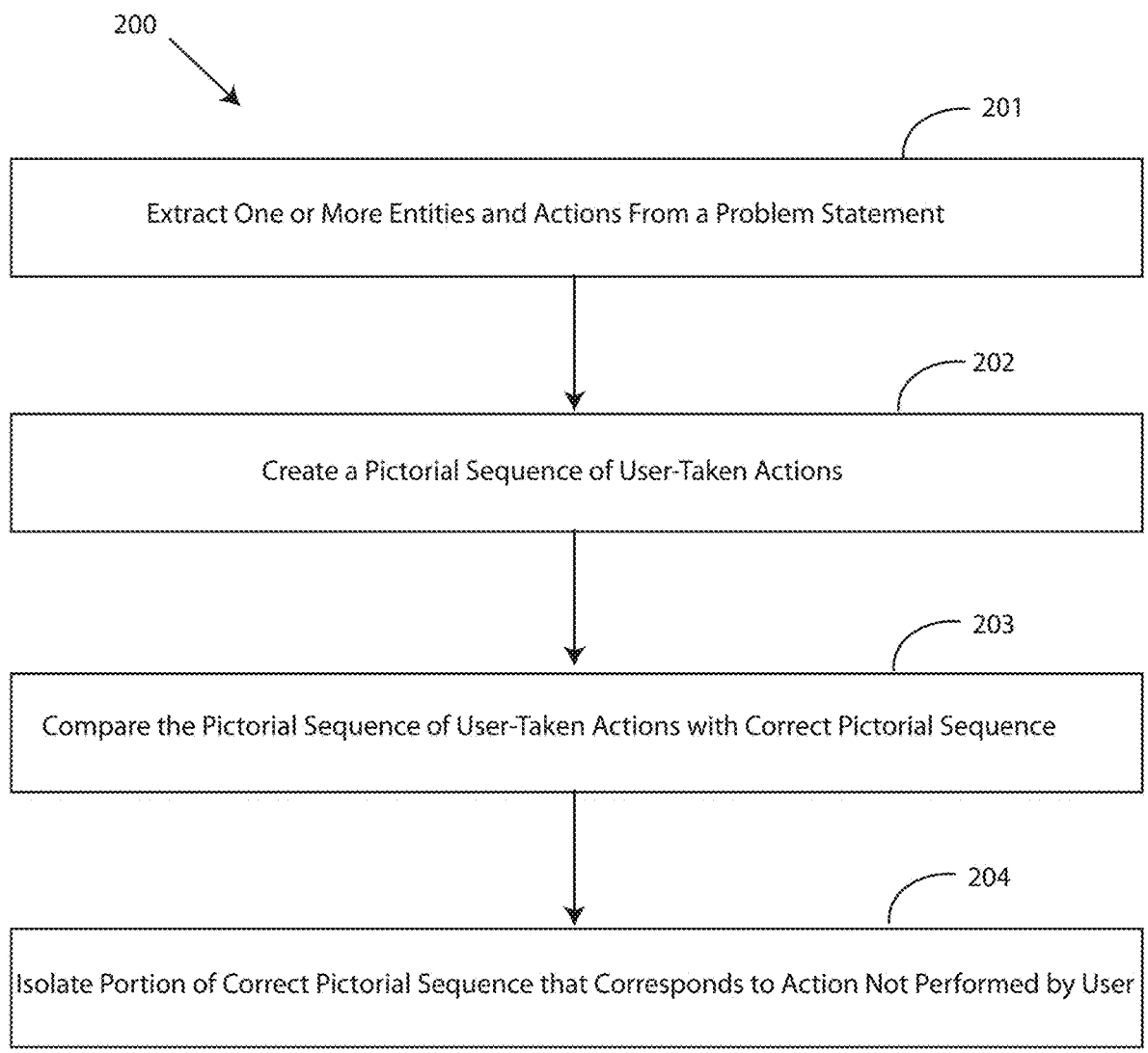
FIG. 9 depicts a flow chart of a method for aiding a user in troubleshooting a problem, in accordance with embodiments of the present invention.

Referring now to FIG. 9, which depicts a flow chart of a method 200 for aiding a user in troubleshooting a problem, in accordance with embodiments of the present invention. One embodiment of a method 200 or algorithm that may be implemented for aiding a user in troubleshooting a problem with the VATS 100 described in FIGS. 1-8 using one or more computer systems as defined generically in FIG. 11 below, and more specifically by the specific embodiments of FIG. 1.

Figure 10:
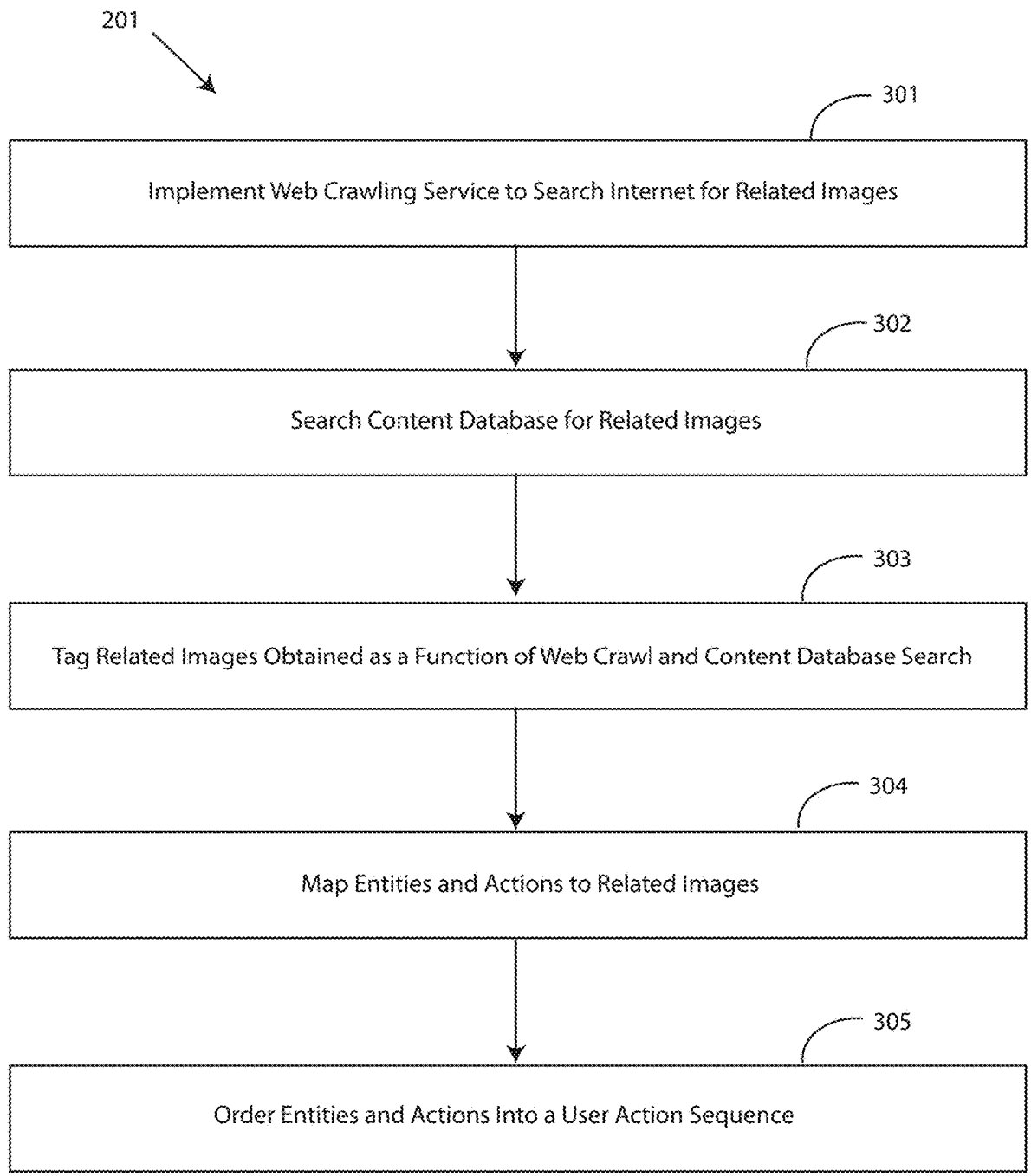
FIG. 10 depicts a detailed flow chart of a step of the method of FIG. 9 for aiding a user in troubleshooting a problem, in accordance with embodiments of the present invention.

Embodiments of the method 200 for aiding a user in troubleshooting a problem, in accordance with embodiments of the present invention, may begin at step 201 wherein one or more entities or actions are extracted from a problem statement, which may be configured to be input by a user at a user device 110. FIG. 10 depicts a detailed flow chart of a step 201 of method 200 for aiding a user in troubleshooting a problem, in accordance with embodiments of the present invention. Embodiments of the step 201 may include step 301, which implements a web crawling service to search the Internet for related images. Step 302 searches a content database for related images. Step 303 tags the related images obtained as a function of the web crawling service and/or the content database search. Step 304 maps the entities and the action of the problem statement to the related images. Step 305 orders the entities and action into a user action sequence. Referring back to FIG. 9, step 202 creates a pictorial sequence of user-taken actions. Step 203 compares the pictorial sequence of user-taken actions with a correct pictorial sequence to correct the underlying problem of the problem statement. Step 204 isolates a portion of the correct pictorial sequence that corresponds to an action not performed by the user, which if performed, may resolve the problem.

Figure 11:
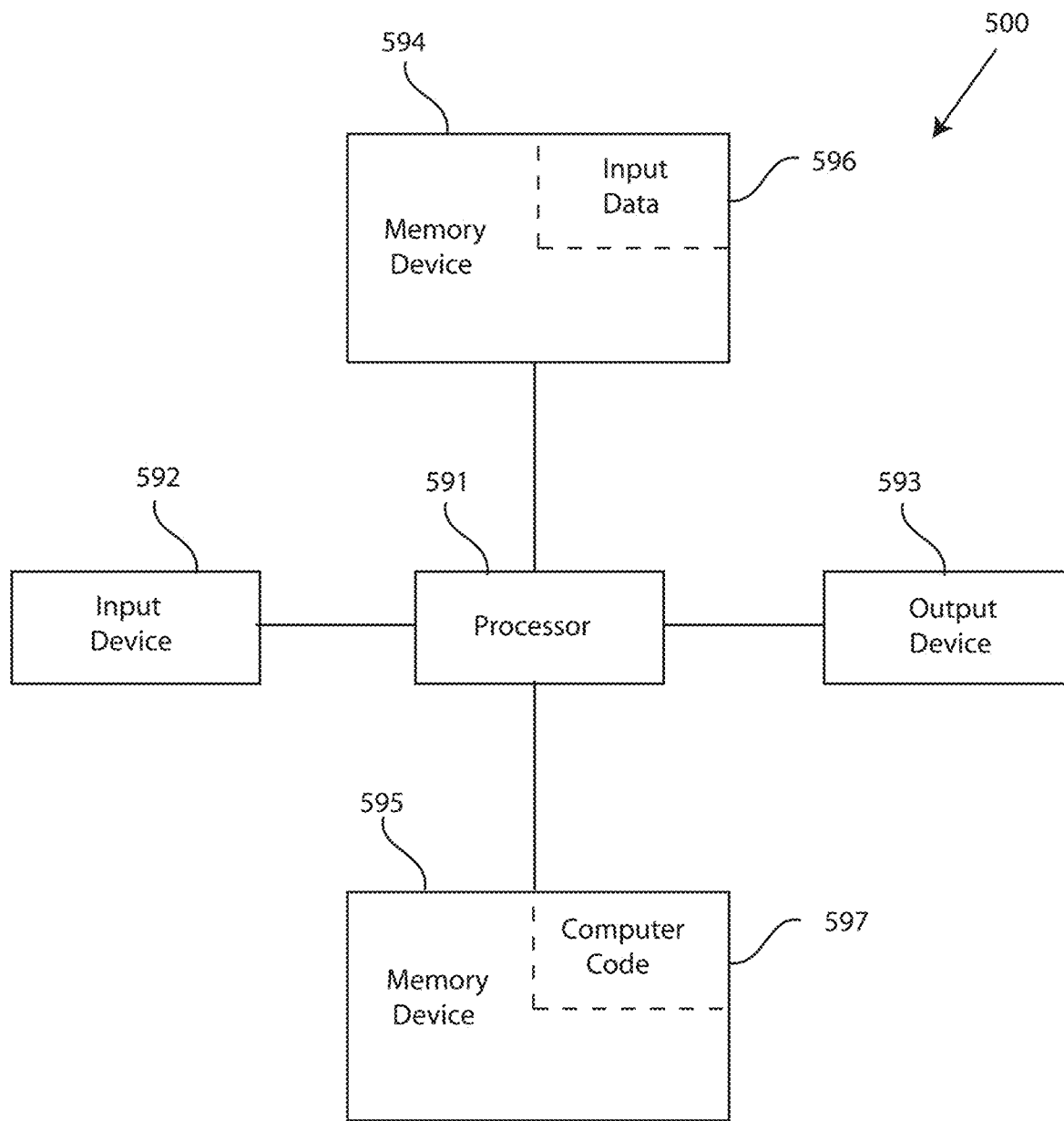
FIG. 11 depicts a block diagram of a computer system for the virtual action-based troubleshooting system of FIGS. 1-8, capable of implementing methods for aiding a user in troubleshooting a problem of FIGS. 9-10, in accordance with embodiments of the present invention.

FIG. 11 depicts a block diagram of a computer system for the VATS 100 of FIGS. 1-8, capable of implementing methods for aiding a user in troubleshooting a problem of FIGS. 9-10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for aiding a user in troubleshooting a problem in the manner prescribed by the embodiments of FIGS. 9-10 using the VATS 100 of FIGS. 1-8, wherein the instructions of the computer code 597 may be executed by processor 591 via memory device 595. The computer code 597 may include software or program instructions that may implement one or more algorithms for implementing the method for aiding a user in troubleshooting a problem, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to virtual action-based troubleshooting systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to aid a user in troubleshooting a problem. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for aiding a user in troubleshooting a problem. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for aiding a user in troubleshooting a problem.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
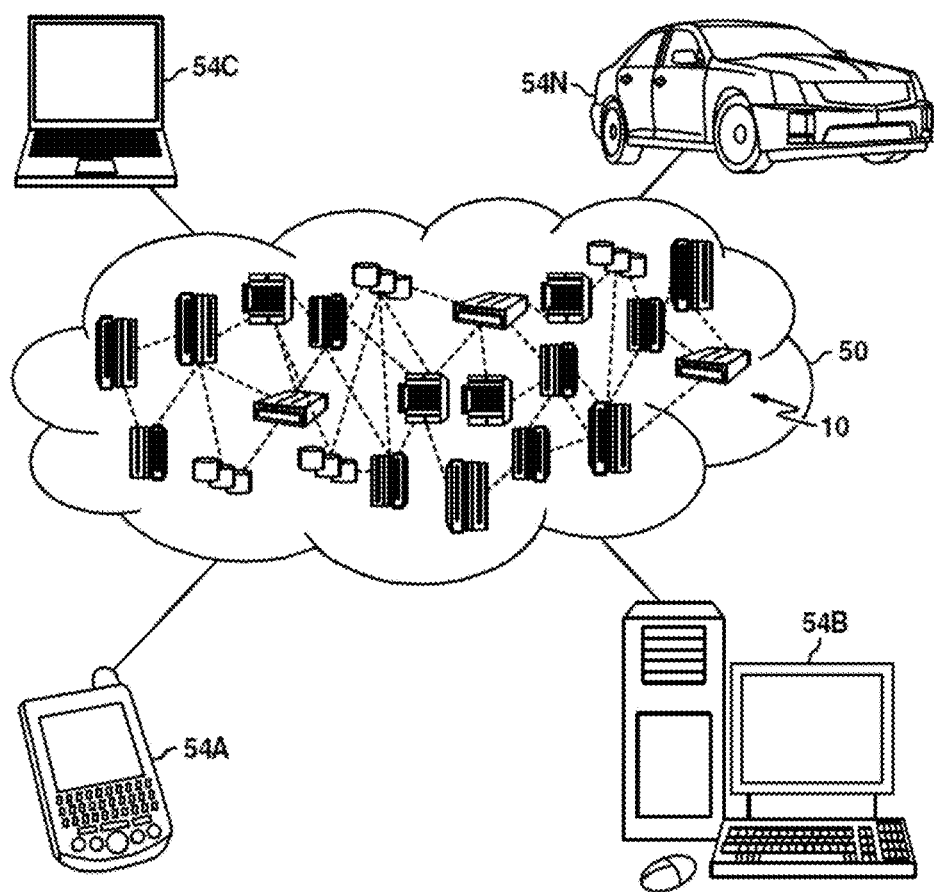
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 13:
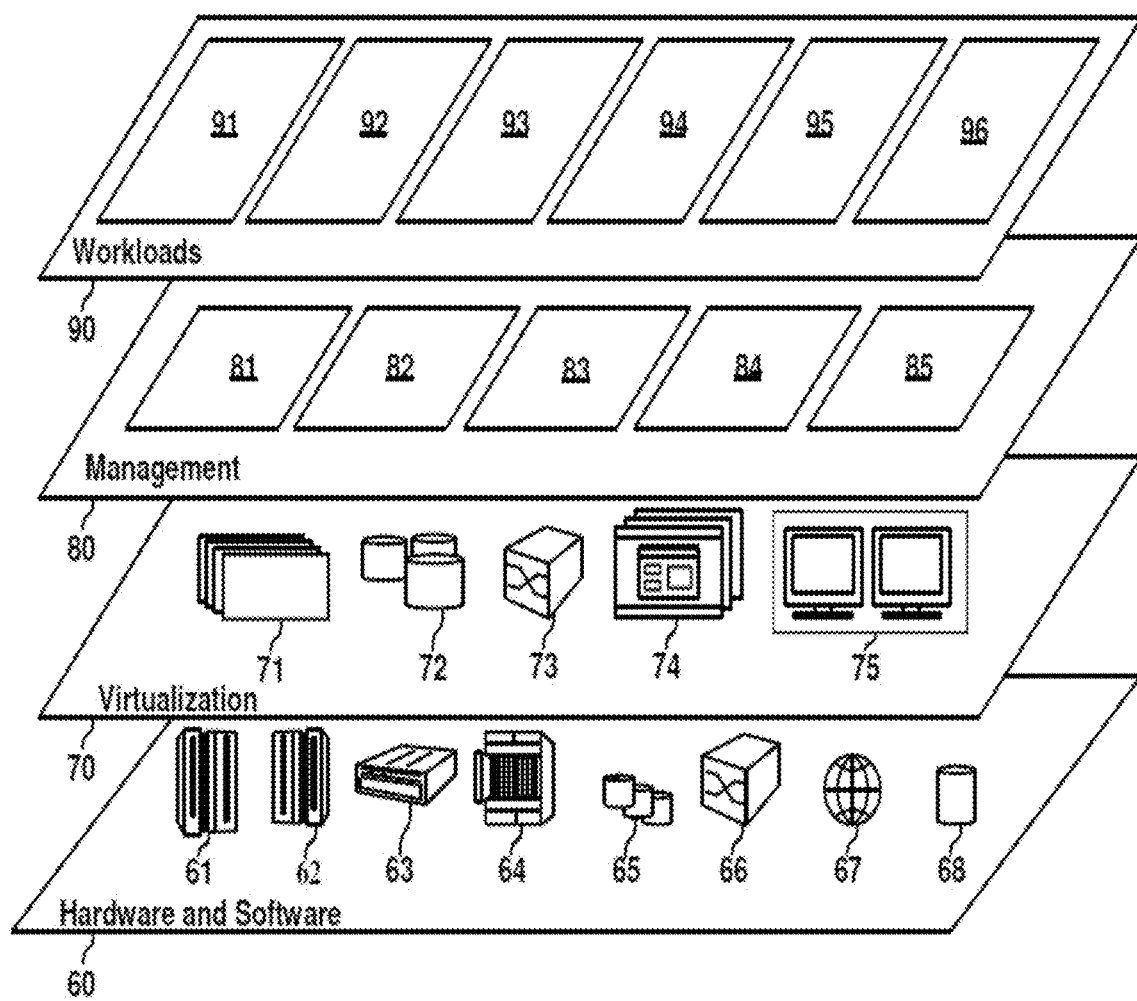
FIG. 13 depicts abstraction model layers, in accordance with embodiments of the present invention.

Referring now to FIG. 13, a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual action-based troubleshooting 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for aiding a user in troubleshooting a problem, the method comprising:

extracting, by a processor of a computing system, one or more entities and actions from a problem statement received from a user computing device, input by the user, wherein, in response to the extracting:

mapping, by the processor, the one or more entities and actions to one or more images related to the one or more entities and actions, wherein the mapping includes:

implementing, by the processor, a web crawling service to crawl the Internet for images related to the one or more entities and actions;

searching, by the processor, a content database for stored images relating to the one or more entities and actions; and tagging, by the processor, the one or images obtained as a function of the implementing the web crawling service and searching the image content database with a related action or entity from the one or more entities and actions; and ordering, by the processor, the one or more entities and actions into a user action sequence;

creating, by the processor, a pictorial sequence of user-taken actions to correct the problem, wherein the pictorial sequence is displayed to the user on the user computing system, and includes the one or more images arranged in an order consistent with the user action sequence;

comparing, by the processor, the pictorial sequence of user-taken actions to correct the problem with a correct pictorial sequence to correct the problem, to identify a correct action that the user failed to perform; and isolating, by the processor, a portion of the correct pictorial sequence that corresponds to the correct action that the user failed to perform, for displaying to the user on the user computing system.

2. The method of claim 1, further comprising: providing, by the processor, the correct pictorial sequence to correct the problem to the user computing device, in response to learning that the problem is still not resolved.

3. The method of claim 1, wherein the ordering the one or more entities and actions into the user action sequence includes: tracking, by the processor, a sequential order that text of the problem statement is input by the user, as problem statement is received.

4. The method of claim 1, further comprising: requesting, by the processor, that the user confirm an accuracy of the pictorial sequence of user-taken actions, prior to the comparing the pictorial sequence of user-taken actions with the correct pictorial sequence.

5. The method of claim 1, wherein the correct pictorial sequence to correct the problem is stored on a content database, which is accessed by the processor of the computing system for comparing with the pictorial sequence of user-taken actions.

6. The method of claim 5, wherein the content database is updated over time to improve an accuracy of currently stored correct pictorial sequences associated with various problems, based on information learned from accessing the Internet to crawl for images related to entities and actions.

7. A virtual assistant computing system, comprising:
a processor;
a memory device coupled to the processor; and
a computer readable storage device coupled to the processor, wherein the storage device contains program code executable by the processor via the memory device to implement a method for aiding a user in troubleshooting a problem, the method comprising:
extracting, by a processor of a computing system, one or more entities and actions from a problem statement received from a user computing device, input by the user, wherein, in response to the extracting:
mapping, by the processor, the one or more entities and actions to one or more images related to the one or more entities and actions, wherein the mapping includes:
implementing, by the processor, a web crawling service to crawl the Internet for images related to the one or more entities and actions;
searching, by the processor, a content database for stored images relating to the one or more entities and actions; and
tagging, by the processor, the one or images obtained as a function of the implementing the web crawling service and searching the image content database with a related action or entity from the one or more entities and actions; and
ordering, by the processor, the one or more entities and actions into a user action sequence;

creating, by the processor, a pictorial sequence of user-taken actions to correct the problem, wherein the pictorial sequence is displayed to the user on the user computing system, and includes the one or more images arranged in an order consistent with the user action sequence;

comparing, by the processor, the pictorial sequence of user-taken actions to correct the problem with a correct pictorial sequence to correct the problem, to identify a correct action that the user failed to perform; and isolating, by the processor, a portion of the correct pictorial sequence that corresponds to the correct action that the user failed to perform, for displaying to the user on the user computing system.

8. The virtual assistant computing system of claim 7, further comprising:
providing, by the processor, the correct pictorial sequence to correct the problem to the user computing device, in response to learning that the problem is still not resolved.

9. The virtual assistant computing system of claim 7, wherein the ordering the one or more entities and actions into the user action sequence includes: tracking, by the processor, a sequential order that text of the problem statement is input by the user, as problem statement is received.

10. The virtual assistant computing system of claim 7, further comprising:
requesting, by the processor, that the user confirm an accuracy of the pictorial sequence of user-taken actions, prior to the comparing the pictorial sequence of user-taken actions with the correct pictorial sequence.

11. The virtual assistant computing system of claim 7, wherein the correct pictorial sequence to correct the problem is stored on a content database, which is accessed by the processor of the computing system for comparing with the pictorial sequence of user-taken actions.

12. The virtual assistant computing system of claim 11, wherein the content database is updated over time to improve an accuracy of currently stored correct pictorial sequences associated with various problems, based on information learned from accessing the Internet to crawl for images related to entities and actions.

13. A computer program product, comprising a computer readable hardware storage device storing a computer readable program code, the computer readable program code comprising an algorithm that when executed by a computer processor of a computing system implements a method for aiding a user in troubleshooting a problem, the method comprising:
extracting, by a processor of a computing system, one or more entities and actions from a problem statement received from a user computing device, input by the user, wherein, in response to the extracting:
mapping, by the processor, the one or more entities and actions to one or more images related to the one or more entities and actions, wherein the mapping includes:
implementing, by the processor, a web crawling service to crawl the Internet for images related to the one or more entities and actions;
searching, by the processor, a content database for stored images relating to the one or more entities and actions; and
tagging, by the processor, the one or images obtained as a function of the implementing the web crawling service and searching the image content database with a related action or entity from the one or more entities and actions; and ordering, by the processor, the one or more entities and actions into a user action sequence;

creating, by the processor, a pictorial sequence of user-taken actions to correct the problem, wherein the pictorial sequence is displayed to the user on the user computing system, and includes the one or more images arranged in an order consistent with the user action sequence;

comparing, by the processor, the pictorial sequence of user-taken actions to correct the problem with a correct pictorial sequence to correct the problem, to identify a correct action that the user failed to perform; and isolating, by the processor, a portion of the correct pictorial sequence that corresponds to the correct action that the user failed to perform, for displaying to the user on the user computing system.

14. The computer program product of claim 13, further comprising: providing, by the processor, the correct pictorial sequence to correct the problem to the user computing device, in response to learning that the problem is still not resolved.

15. The computer program product of claim 13, wherein the ordering the one or more entities and actions into the user action sequence includes: tracking, by the processor, a sequential order that text of the problem statement is input by the user, as problem statement is received.

16. The computer program product of claim 13, further comprising: requesting, by the processor, that the user confirm an accuracy of the pictorial sequence of user-taken actions, prior to the comparing the pictorial sequence of user-taken actions with the correct pictorial sequence.

17. The computer program product of claim 13, wherein the correct pictorial sequence to correct the problem is stored on a content database, which is accessed by the processor of the computing system for comparing with the pictorial sequence of user-taken actions, wherein the content database is updated over time to improve an accuracy of currently stored correct pictorial sequences associated with various problems, based on information learned from accessing the Internet to crawl for images related to entities and actions.

* * * * *